United States Patent
Hatayama et al.

(10) Patent No.: US 6,332,055 B1
(45) Date of Patent: Dec. 18, 2001

(54) OPTICAL ATTENUATOR, PLANE WAVEGUIDE TYPE OPTICAL CIRCUIT HAVING THE SAME AND OPTICAL ATTENUATION SYSTEM HAVING THE SAME

(75) Inventors: Hitoshi Hatayama; Eisuke Sasaoka, both of Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/517,521

(22) Filed: Mar. 2, 2000

(30) Foreign Application Priority Data

Mar. 2, 1999 (JP) .................................................. 11-054287

(51) Int. Cl.$^7$ ...................................................... G02B 6/26
(52) U.S. Cl. .............................. 385/140; 385/39; 385/40; 385/42
(58) Field of Search ............................... 385/15, 39–42, 385/45, 50, 140

(56) References Cited

U.S. PATENT DOCUMENTS 5,881,199 * 3/1999 Li ........................................ 385/140
5,970,201 * 10/1999 Anthony et al. ..................... 385/140

FOREIGN PATENT DOCUMENTS 5-173101   7/1993   (JP) .
6-324367   11/1994  (JP) .

OTHER PUBLICATIONS

Clapp et al, "Broadband Variable Optical Attenuator In Silica Waveguide Technology", 24th European Conference On Optical Communication 1998, vol. 1, pp. 301–302, Sep. 20–24, 1998.*

"Silica–Based Optical–Matrix Switch with Intersecting Mach–Zehnder Waveguides for Larger Fabrication Tolerances", by Kawachi et al., OFC/IOOC '93 Technical Digest, Tuesday Afternoon, pp. 33–34.

"Lossless Hybrid Integrated 8–ch Optical Wavelength Selector Module Using PLC Platform and PLC–PLC Direct Attachment Techniques", by Ogawa et al., OFC '98 Post-deadline Papers, pp. PD4–1 through PD4–4.

* cited by examiner

Primary Examiner—John D. Lee
(74) Attorney, Agent, or Firm—McDermott, Will & Emery

(57) ABSTRACT

The present invention relates to an optical attenuator or the like which is easy to manufacture and is able to be miniaturized. In an optical attenuator according to this invention, a plurality of Mach-Zehnder-type waveguide elements are arranged in parallel on the common substrate. Each Mach-Zehnder-type waveguide element is provided with an input optical waveguide, a first directional coupler, two optical waveguides, a second directional coupler, an output optical waveguide, a monitoring optical waveguide and a temperature regulator for regulating the temperature of one of the two optical waveguides. Particularly, between the Mach-Zehnder-type waveguide elements adjacent to each other, an monitoring optical waveguide of one thereof and an output optical waveguide of the other thereof are arranged to cross.

6 Claims, 5 Drawing Sheets

OPTICAL ATTENUATOR, PLANE WAVEGUIDE TYPE OPTICAL CIRCUIT HAVING THE SAME AND OPTICAL ATTENUATION SYSTEM HAVING THE SAME

BACKGROUND OF THE INVENTION

1. Field of the Invention

The present invention relates to an optical attenuator of multi-channels having a plurality of Mach-Zehnder-type waveguide elements, a plane waveguide type optical circuit, and an optical attenuation system having this optical attenuator.

2. Related Background Art

An optical attenuator using Mach-Zehnder-type waveguide elements is known (see, for example, OFC/IOOC' 93 Technical Digest, TuH4 by M. Kawachi, et al. and Japanese Patent Application Laid-open No. Hei 5-173101). As shown in FIG. 1, this optical attenuator has an input optical waveguide 2, a first directional coupler 3, a first optical waveguide 4, a second optical waveguide 5, a second directional coupler 6, an output optical waveguide 7, and a monitoring optical waveguide 8 all of which are provided on a substrate 1. The optical attenuator has also a heater 9 for regulating the temperature of the first optical waveguide 4. A light signal inputted into the input optical waveguide 2 is diverged by the first directional coupler 3 to be inputted into the second directional coupler 6 through the first optical waveguide 4 and the second optical waveguide 5, respectively. The light signal is outputted from the second directional coupler 6 to the optical waveguide 7 and the monitoring optical waveguide 8 at a predetermined diverging ratio. The diverging ratio is controlled by the temperature of the first optical waveguide 4 regulated by the heater 9. By detecting the light power outputted to the monitoring optical waveguide 8 by a light receiving element and by controlling the temperature of the first optical waveguide 4, that is, the optical path length, by the heater 9, the ratio of power P-out of the light signal outputted to the output optical waveguide 7 to the power P-in of the light signal inputted into the input optical waveguide 2, that is, the light attenuation, can be controlled.

As shown in FIG. 2, a plurality of Mach-Zehnder-type waveguide elements are provided in parallel on the common substrate to realize a multi-channel optical attenuator. The multi-channel optical attenuator shown in this figure has eight Mach-Zehnder-type waveguide elements provided in parallel on the common substrate. Each of the Mach-Zehnder-type waveguide elements has an input optical waveguide $2i$, a first directional coupler $3i$, a first optical waveguide $4i$, a second optical waveguide $5i$, a second directional coupler $6i$, an output optical waveguide $7i$ and an monitoring optical waveguide $8i$ provided in the same way as shown in FIG. 1, and is provided with a heater $9i$ for regulating the temperature of the first optical waveguide $4i$ (i=1 to 8).

In addition, by providing a multi-channel output circuit for outputting multi-channel light signals (for example AWG: Arrayed Waveguide Grating) and an optical attenuator of multi-channels having Mach-Zehnder-type waveguide elements according to each output channel of this multi-channel output circuit on the common substrate, a compact plane waveguide-type optical circuit with small differences between the output powers of the channels can be realized.

SUMMARY OF THE INVENTION

The inventors discovered the following problems as a result of researching the prior art described above. That is to say, in the optical attenuator of multi-channels as shown in FIG. 2 and in a plane waveguide-type optical circuit having this optical attenuator, the output optical waveguide 7 and the monitoring optical waveguide 8 are arranged alternately adjacent to each other. Therefore, it is necessary to provide light receiving elements for detecting the light power outputted to the respective monitoring optical waveguides 8 between the respective output optical waveguides 7 for sending the light signals to the following stages. It is difficult to manufacture such a configuration and it has a limit for miniaturization.

The present invention is provided to solve the above mentioned problems with the purpose of providing an optical attenuator and a plane waveguide-type optical circuit which is easy to manufacture and can be miniaturized.

An optical attenuator according to the present invention has a plurality of Mach-Zehnder-type waveguide elements arranged on a substrate each of which has an input optical waveguide to which a light signal is inputted, a first directional coupler connected to the input optical waveguide, two optical waveguides connected to the first directional coupler, a second directional coupler connected to these two optical waveguides, an output optical waveguide and an monitoring optical waveguide connected to the second directional coupler and a temperature regulator for regulating the temperature of at least one of the above two optical waveguides. The output optical waveguide of each of the plurality of Mach-Zehnder-type waveguide elements is disposed along the first direction on the substrate and an monitoring optical waveguide of each of the Mach-Zehnder-type waveguide elements is disposed along either one of the second or third directions crossing the first direction. By this configuration, it becomes possible to provide the output port of the monitoring optical waveguide of each of the plurality of Mach-Zehnder-type waveguide elements in a different region from the region where the output optical waveguide of each of the Mach-Zehnder-type waveguide elements is provided.

The optical attenuator has multi-channels with a plurality of Mach-Zehnder-type waveguide elements. Each of the channels operates as follows. A light signal inputted into the input optical waveguide is diverged by the first directional coupler to reach the second bi-directional coupler through each of the two optical waveguides. The light signal is outputted with a predetermined divergence ratio to the output optical waveguide and the monitoring optical waveguide from the second directional coupler. The divergence ratio is controlled by the temperature of either one of the above two optical waveguides regulated by the temperature regulator. By detecting the light power outputted to the monitoring optical waveguide by the light receiving element, and by controlling the temperature of the optical waveguide, that is, the optical path length, by the temperature regulator, the ratio (P-out/P-in) of the power P-out of the light signal outputted to the output optical waveguide to the power P-in of the light signal inputted into the input optical waveguide, that is, the light attenuation, can be controlled. In the Mach-Zehnder-type waveguide elements located adjacent to each other, it is preferable for the angle θ between the monitoring optical waveguide of one Mach-Zehnder-type waveguide element and the output optical waveguide of the other Mach-Zehnder-type waveguide element to be 1.1 degrees or more but 2.1 degrees or less.

In this optical attenuator, an monitoring optical waveguide for each channel has an output port in a different region from the region where an output optical waveguide corresponding to each channel is provided. In this way, the light receiving elements for receiving light outputted from the outputted ports of the monitoring optical waveguides corresponding to the respective channels can be integrally arranged. Optical fibers for inputting light signals outputted from the output port from each of the optical waveguides corresponding to the respective channels can also be arranged together at the edge of the substrate. Accordingly, this optical attenuator is easy to manufacture and can be miniaturized.

In an optical attenuator according to the present invention, the monitoring optical waveguides of the plurality of Mach-Zehnder-type waveguide elements are arranged in parallel and spaced at a predetermined distance, and are characterized by trenches crossing them formed on the substrate in which light receiving elements for receiving light outputted from each output port of each monitoring optical waveguide are provided. In this case, the optical attenuator is integrated to include the light receiving elements which makes it possible to be miniaturized in this aspect.

A plane waveguide-type optical circuit according to the present invention is characterized in that a multi-channel output circuit for outputting multi-channel light signals and the above mentioned optical attenuator having Mach-Zehnder-type waveguide elements each corresponding to each output channel of the multi-channel output circuit are provided on the common substrate. In this plane waveguide-type optical circuit, the light signals outputted from the respective output channels of the multi-channel output circuit can be adjusted in the attenuation by the above-mentioned multi-channel optical attenuator to have signal light power almost equal to each other in terms of the power of the light signals outputted to the respective output optical waveguides of the optical attenuator. In this plane waveguide-type optical circuit, not only the multi-channel optical attenuator but also a multi-channel optical circuit for outputting multi-channel light signals are provided on the common substrate so that the plane waveguide-type optical circuit is easy to manufacture as well as miniaturize.

In addition, an optical attenuation system according to this invention is provided with an optical attenuator having the above-mentioned plurality of Mach-Zehnder-type waveguide elements and monitors the light power outputted to the above-mentioned monitoring optical waveguides using the light receiving element which are further provided with a control system for controlling the above-mentioned temperature regulator based on the result of the monitoring.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

An embodiment of the present invention is described in detail referring to the attached drawings hereinafter. In the description about the drawings, the same elements are referred to by the same numerals to omit redundant descriptions.

Figure 1:
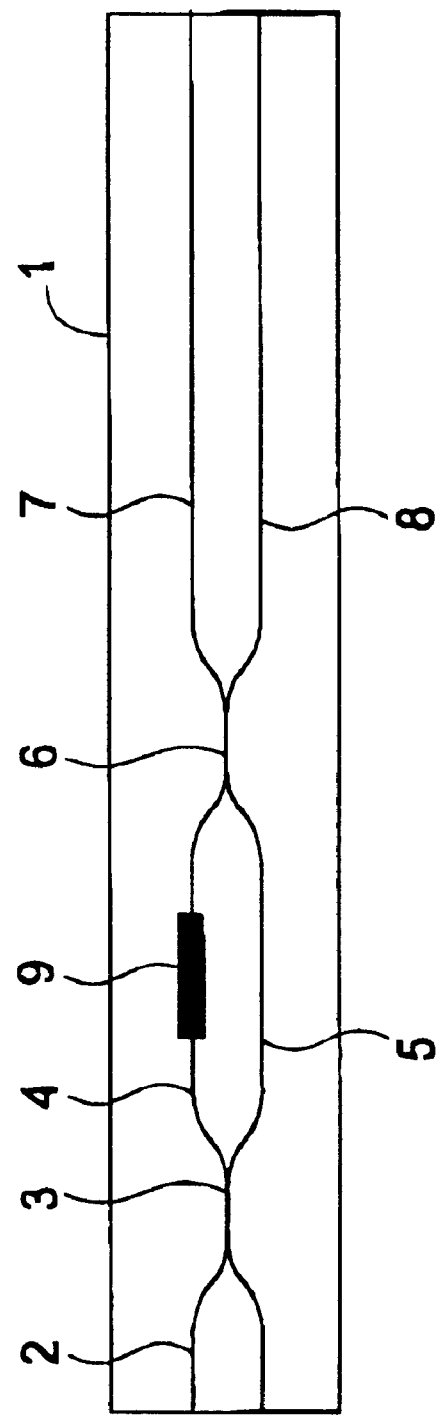
FIG. 1 shows a configuration of a conventional optical attenuator.
Figure 2:
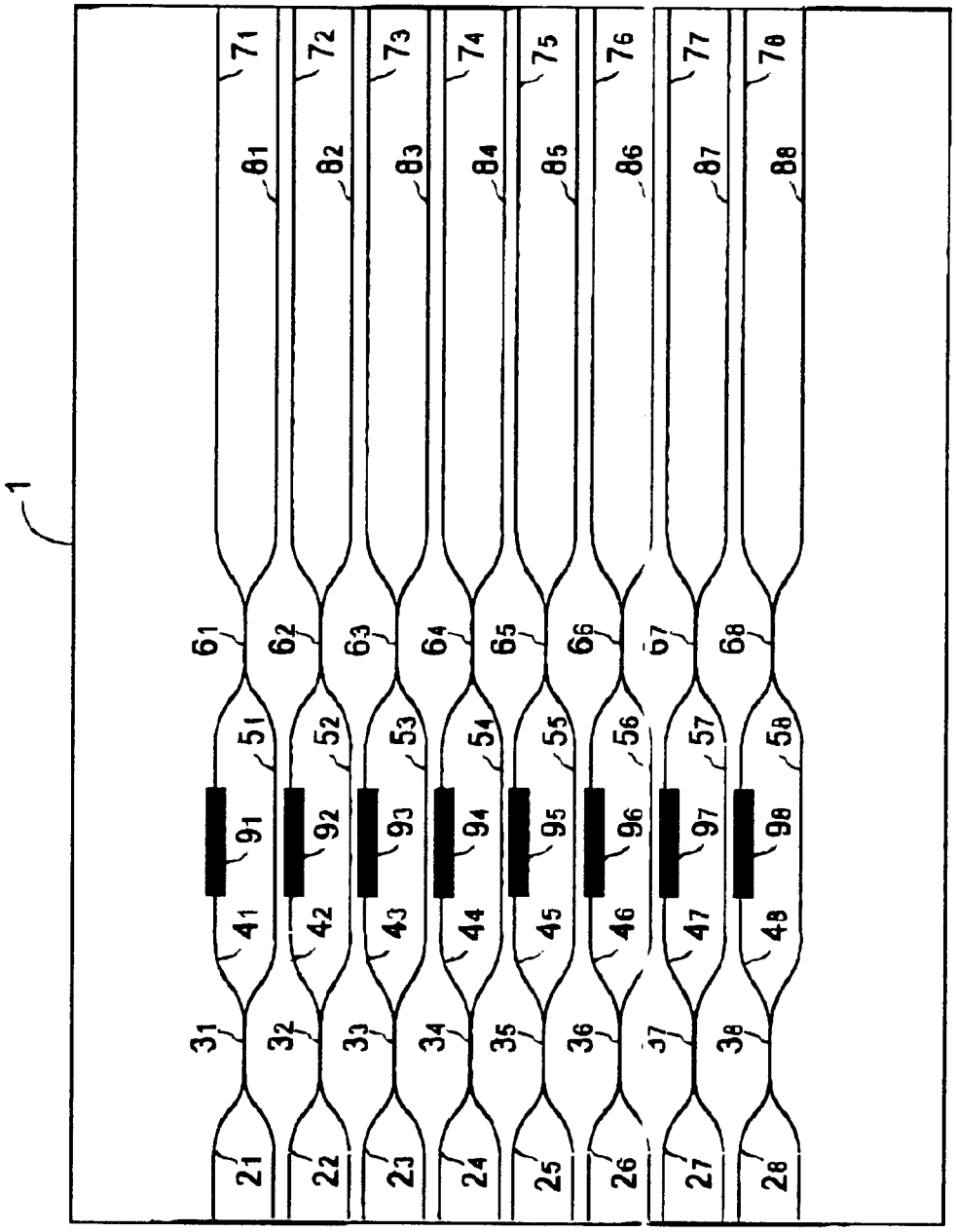
FIG. 2 shows a configuration of a conventional multi-channel optical attenuator.
Figure 3:
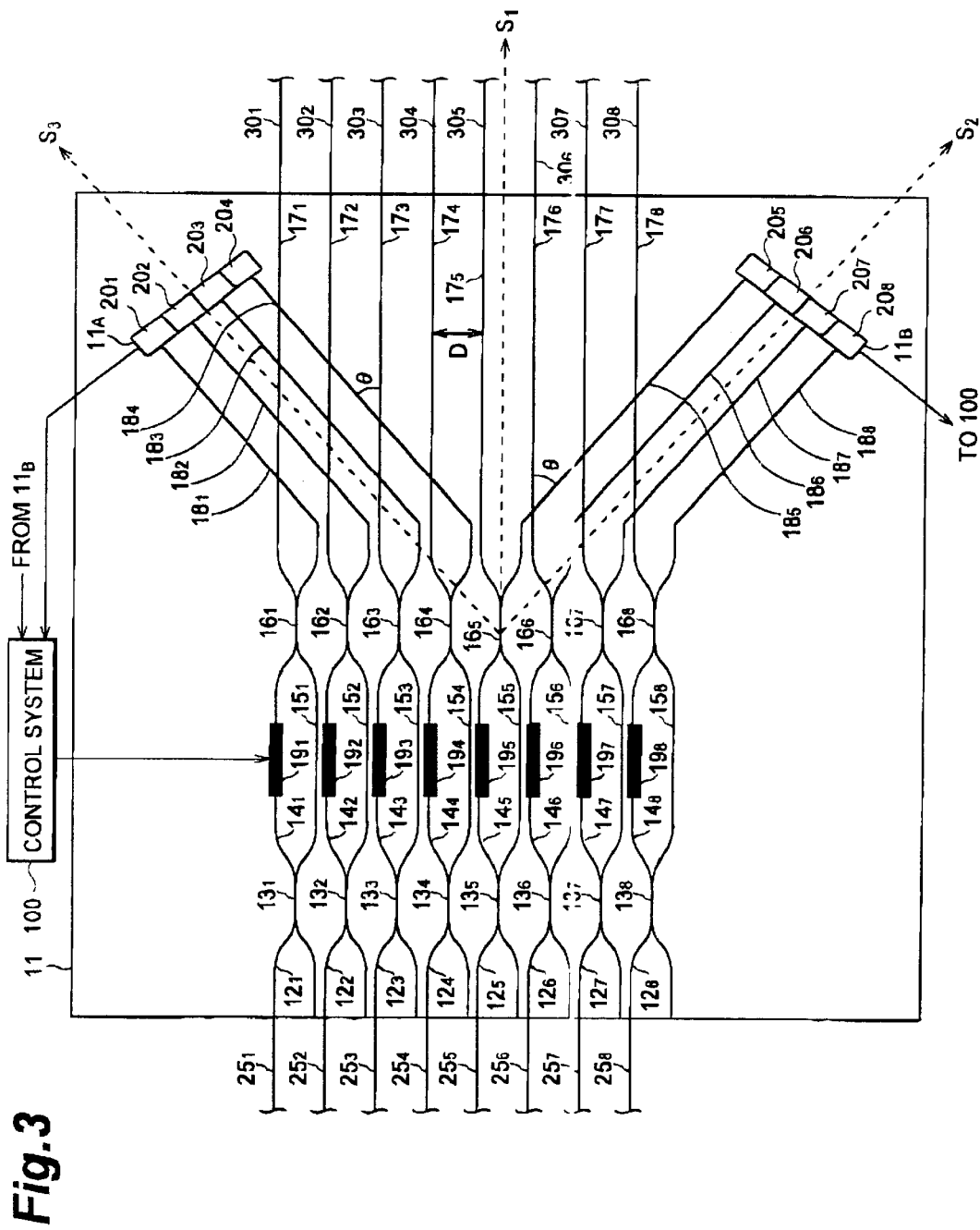
FIG. 3 shows a configuration of an optical attenuator and an optical attenuation system having the same according to the present invention.

First, an embodiment of an optical attenuator according to the present invention is described. FIG. 3 shows a configuration of an optical attenuator and an optical attenuator system having the same according to the present embodiment. This optical attenuator has eight Mach-Zehnder-type waveguide elements provided in parallel on the common substrate 11, which functions as an eight-channel optical attenuator. The Mach-Zehnder-type waveguide element corresponding to each channel has an input optical waveguide $12_i$ connected optically to an external optical circuit $25_i$, a first directional coupler $13_i$, a first optical waveguide $14_i$, a second optical waveguide $15_i$, a second directional coupler $16_i$, an output optical waveguide $17_i$ and an monitoring optical waveguide $18_i$ connected optically to an external optical waveguide $30_i$ provided on the substrate and is provided with a heater $19_i$ for regulating the temperature of the first optical waveguide $14_i$ (I=1 to 8).

Each of the eight optical output waveguides $17_1$–$17_8$ is arranged in parallel with each other along the arrow $S_1$ having an output port at the edge of the substrate 11. Each of the eight monitoring optical waveguides $18_1$–$18_8$ has an output port arranged in a different region from the region where eight output optical waveguides $17_1$–$17_8$ are provided. That is to say, the monitoring optical waveguides $18_1$–$18_4$ have output ports at the trench 11A provided on the substrate 11. And, the monitoring optical waveguides $18_5$–$18_8$ have output ports at the trench 11B provided on the substrate 11.

In the proximity of the trench 11A, the monitoring optical waveguides $18_1$–$18_4$ are arranged in parallel with each other at predetermined intervals along the arrow $S_3$ and the trench 11A is formed across them. In the trench 11A, light receiving elements $20_1$–$20_4$ are provided for receiving light outputted from respective output ports of the monitoring optical waveguides $18_1$–$18_4$. The light receiving elements $20_1$–$20_4$ may be individual but are preferably formed in an array on a common base.

In the same way, in the proximity of the trench 11B, each of the monitoring optical waveguides $18_5$–$18_8$ is in parallel with each other along the arrow $S_2$ and spaced next to each other at a predetermined distance with the trench 11B formed crossing them. In the trench 11B, light receiving elements $20_5$–$20_8$ are provided for receiving light outputted from respective output ports of the monitoring optical waveguides $18_5$–$18_8$. The light receiving elements $20_5$–$20_8$ may be individual but are preferably formed in an array on a common base.

Further, in the optical attenuation system according to the present invention, the outputs of the light receiving elements $20_1$–$20_4$ and $20_5$–$20_8$ are monitoring by the control system 100, which controls the temperature of the heaters $19_1$–$19_8$ while monitoring the output fluctuation of those light-receiving elements $20_1$–$20_8$.

An optical attenuator according to the present embodiment operates as follows. A light signal inputted into the input optical waveguide $12_i$ is diverged by the directional coupler $13_i$ to reach the directional coupler $16_i$ through the optical waveguide $14_i$ and the optical waveguide $15_i$, respectively. The light signal is outputted with a predetermined divergence ratio to the output optical waveguide $17_i$ and the monitoring optical waveguide $18_i$ from the directional coupler $16_i$. The divergence ratio is controlled by the temperature of the optical waveguide $14_i$ regulated by the heater $19_i$. By detecting the light power outputted to the monitoring optical waveguide $18_i$ by the light-receiving element $20_i$, and by controlling the temperature of the optical waveguide $14_i$, that is, the optical path length, by the heater $19_i$, the ratio (P-out/P-in) of P-out of the light signal outputted to the output optical waveguide $17_i$ to the power P-in of the light signal inputted to the input optical waveguide $12_i$, that is, the light attenuation, can be controlled.

Figure 4:
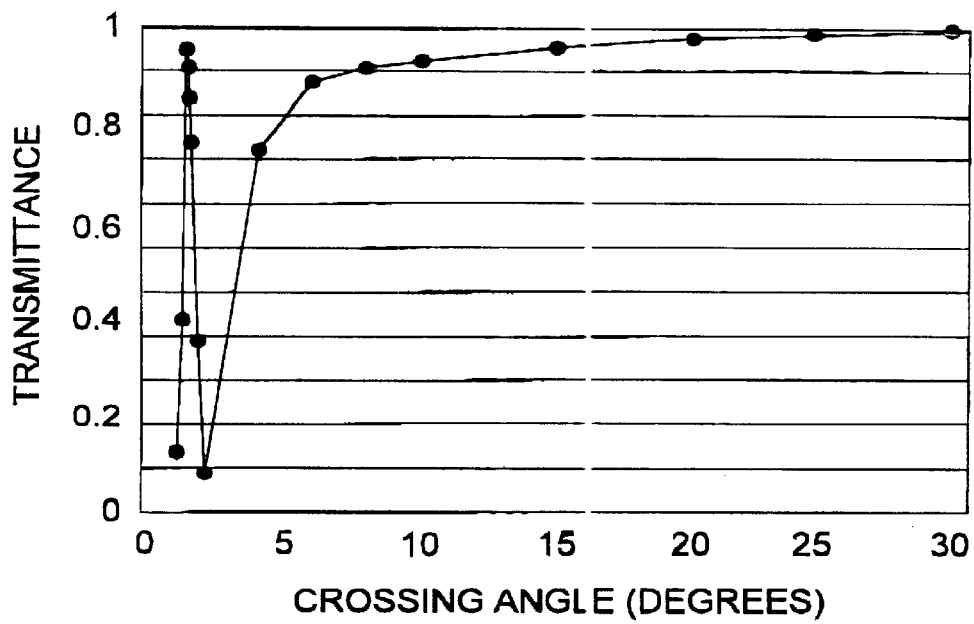
FIG. 4 shows a graph plotting the transmittance for the crossing angle between the output optical waveguide and the monitoring optical waveguide.
Figure 5:
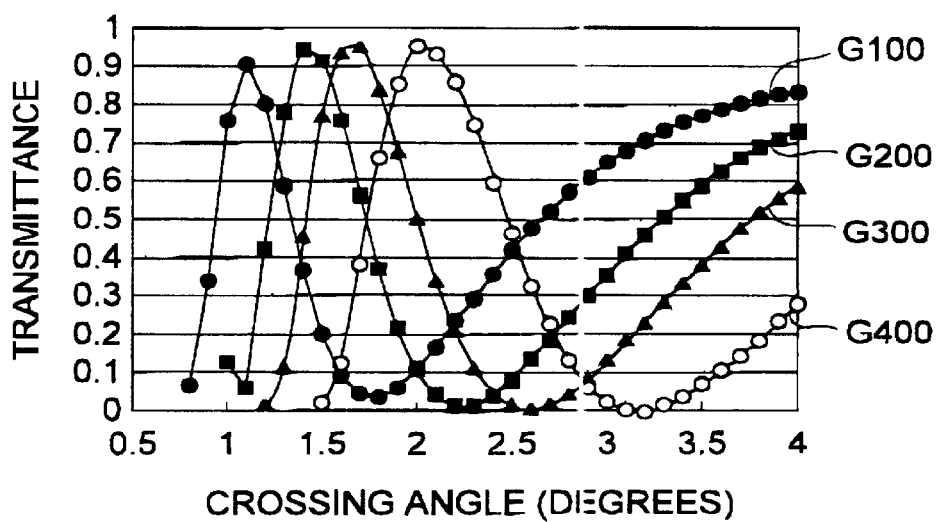
FIG. 5 shows graphs plotting the transmittance for the crossing angle between the output optical waveguide and the monitoring optical waveguide at the various refractive index difference of each optical waveguide with respect to the substrate.

In the present embodiment, since the output optical waveguide 17 and the monitoring optical waveguide 18 cross on the substrate 11, the cross-talk of their light signals becomes a problem. That is to say, in case the crossing angle is not proper the mode coupling between the output optical waveguide 17 and the monitoring optical waveguide 18 causes the cross-talk to lower the transmittance of the light signals. FIG. 4 shows a graph plotting the transmittance in terms of the crossing angles between the output optical waveguide 17 and the monitoring optical waveguide 18.

This graph shows that in case the crossing angle θ is 30 degrees or more, the transmittance converges by 99%. To make the crossing angle θ 30 degrees or more, it is necessary to have a wide space D (a space between the centers of each optical waveguide) between the adjacent monitoring waveguides $17_i$. For example, in case the curvature radius is 5 mm or more, it is necessary for the space D to be 670 μm or more. Therefore, this case is not necessarily suitable for compact integration.

On the other hand, this graph also shows that in the range from about 2 degrees to about 10 degrees of the crossing angle θ, the smaller the crossing angle θ is, the smaller the transmittance is, and that a crossing angle θ in the range below about 2 degrees the transmittance has the maximum (transmittance peak). More concretely, when the crossing angle θ is 1.44 degrees the transmittance is 96% and the cross-talk is −38 dB. In case the crossing angle θ is 1.44 degrees, a space D between the waveguides for monitoring $17_i$ can be narrowed.

In addition, the inventors confirmed that the above-mentioned optimal crossing angle varies on the basis of the difference between various relative refractive index differences of each optical waveguide with respect to the substrate 11. FIG. 3 shows graphs plotting the transmittance in terms of the crossing angle between the output optical waveguide 17 and the monitoring optical waveguide 18, in the various relative refractive index differences Δ of each optical waveguide with respect to the substrate 11. In FIG. 3, the graph G100 indicates the relationship between the crossing angle and the transmittance in Δ=0.45%, the graph G200 indicates the relationship between the crossing angle and the transmittance in Δ=0.75%, the graph G300 indicates the relationship between the crossing angle and the transmittance in Δ=1.00%, and the graph G400 indicates the relationship between the crossing angle and the transmittance in Δ=1.5%. Also, the relative refractive index difference Δ of each optical waveguide with respect to the substrate 11 is defined as follows:

$$\Delta = (n_1^2 - n_2^2)/2n_1^2 \approx (n_1 - n_2)/n_1$$

where $n_1$ is the refractive index of each optical waveguide and $n_2$ is the refractive index of the substrate 11. In the specification, the relative refractive index difference Δ is expressed in terms of percentage.

As can be understood from these graphs, when the relative refractive index difference Δ of each optical waveguide with respect to the substrate 11 increases, the optimal crossing angle in the transmittance peak also increases in accordance with the increasing of Δ. For example, the crossing angle in the transmittance peak is 1.1 degrees in the graph G100, the crossing angle in the transmittance peak is 1.4 degrees in the graph G200, the crossing angle in the transmittance peak is 1.7 degrees in the graph G300, and the crossing angle in the transmittance peak is 2.1 degrees in the graph G400. Therefore, as considering the above measurement results, the optimal crossing angle for minimizing the cross-talk between the output optical waveguide 17 and the monitoring optical waveguide 18 is preferably set in the range from 1.1 degrees to 2.1 degrees.

In an optical attenuator according to the present embodiment, each of the eight monitoring optical waveguides $18_1$–$18_8$ has an output port arranged in a different region from the region where eight output optical waveguides $17_1$–$17_8$ are provided. In this way, the light receiving elements $20_1$–$20_8$ can be provided together for receiving the light from each of the output ports of the monitoring optical waveguides $18_1$–$18_8$. The optical fibers $30_1$–$30_8$ can also be arranged together at the edge of the substrate 11 for inputting light signals outputted from each of the output ports of the output optical waveguides $17_1$–$17_8$. Therefore an optical attenuator according to the present embodiment is easy to manufacture and can be miniaturized.

An optical attenuator according to the present embodiment is integrated to include the respective groups of light receiving elements $20_1$–$20_4$ and $20_5$–$20_8$ by respectively providing the groups $20_1$–$20_4$ and $20_5$–$20_8$ in the trenches 11A, 11B provided on the substrate 11. Therefore it is possible to miniaturize this optical attenuator in this embodiment.

Figure 6:
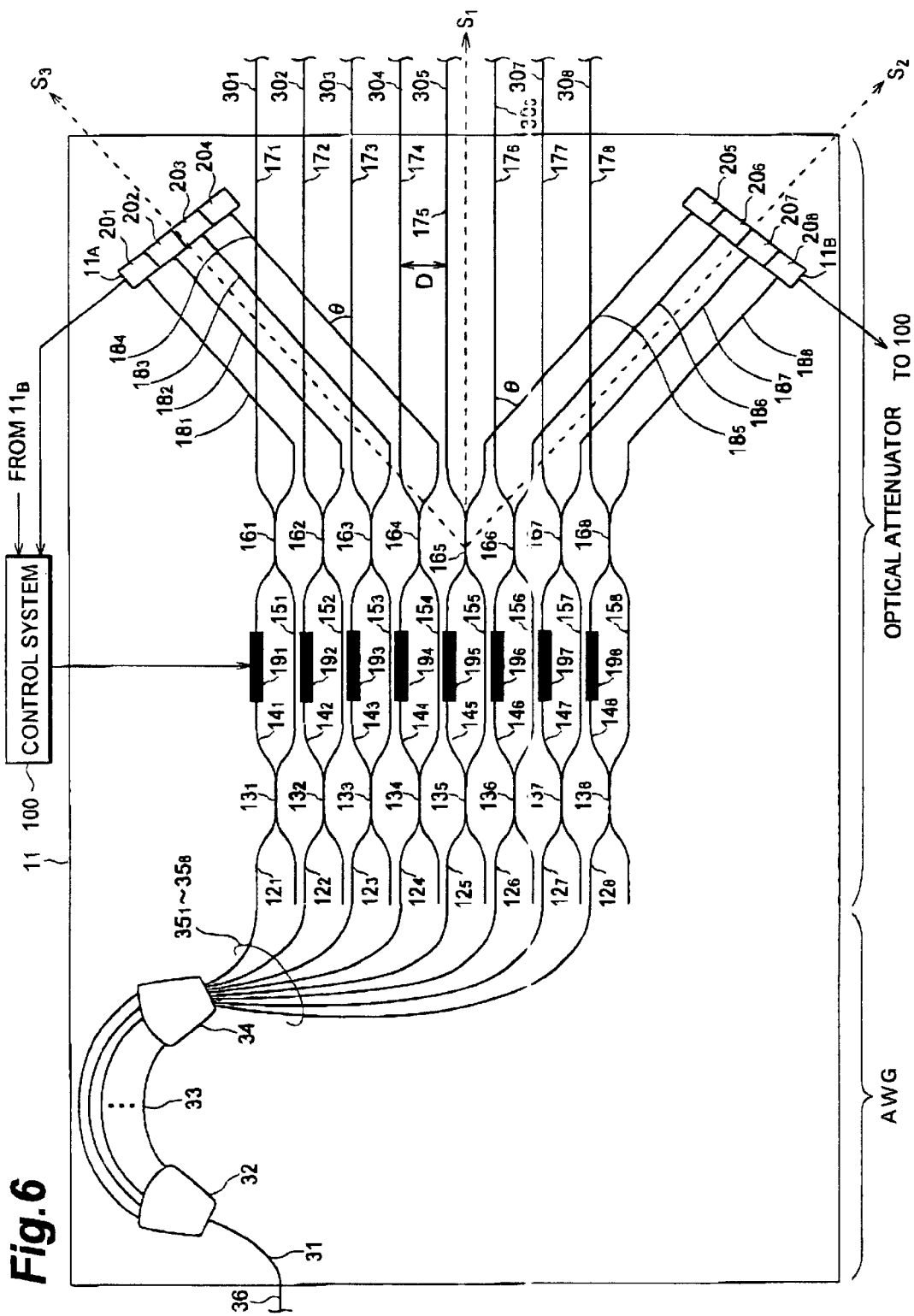
FIG. 6 shows a configuration of a plane waveguide-type optical circuit and an optical attenuation system having the same according to the present embodiment.

Next, an embodiment of a plane waveguide-type optical circuit according to the present invention is described. FIG. 6 shows a configuration of a plane waveguide-type optical circuit and an optical attenuation system having the same according to the present embodiment. The plane waveguide-type optical circuit has an AWG which is a multi-channel output circuit for outputting multi-channel light signals and the above-described optical attenuator provided on the common substrate 11. The AWG is configured with an input optical waveguide 31 connected optically to an external optical waveguide 36, a slab waveguide 32, an array waveguide part 33 and a slab waveguide 34. The slab waveguide 34 of the AWG and the input optical waveguides $12_1$–$12_8$ for the optical attenuator are connected optically through the intermediate optical waveguides $35_1$–$35_8$.

The slab waveguide 32 diffracts and guides the light signal inputted from the input optical waveguide 31 into each of the optical waveguides comprising the array waveguide part 33. And, the slab waveguide 34 diffracts and guides the light signal inputted from the array waveguide part 33 into the input optical waveguide $12_1$–$12_8$ for the optical attenuator. The array waveguide part 33 provided between the slab waveguide 32 and the slab waveguide 34 comprises a plurality of optical waveguides, and each of those optical waveguides has optical path lengths differing from each other by a predetermined length so that light propagates through each of them is given a phased difference.

Next, the operation of a plane waveguide-type optical circuit according to the present embodiment is described. Light signals inputted to the input optical waveguide 31 of the AWG are presumed to be of eight waves of wavelength of $\lambda_1$–$\lambda_8$. A light signal inputted into the input optical waveguide 31 of the AWG is inputted to the slab waveguide 32 after propagating through the input optical waveguide 31. In the slave waveguide 32, the light signal inputted passes while diffracting toward the array waveguide part 33. Each of the wavelength components of the light signal inputted into the array waveguide part 33 reaches the slab waveguide 34 after propagating through all of the plurality of optical waveguides of the array waveguide part 33. Then each of the wavelength components of the light signal propagates through the slab waveguide 34 toward the input optical waveguides $12_1$–$12_8$ of the optical attenuator while diffracting.

Since each of the optical pathlengths of the plurality of optical waveguides of the array waveguide part 33 differs by a predetermined length, a light signal propagating through each of them is given a phase difference according to its wavelength. And at the point when it reaches the input optical waveguide $12_i$ after propagating through the array waveguide part 33 and slab waveguide 34, the light signals of wavelength $\lambda_1$ reinforce each other while the other wavelength $\lambda_j$ ($j \neq i$) offset each other (i, j=1 to 8). Therefore, a light signal of the wavelength $\lambda_1$ is outputted to the input optical waveguide $12_1$ (i=1 to 8). That is to say, the AWG works as an optical branching filter.

A light signal of the wavelength $\lambda_1$ inputted into the input optical waveguide $12_i$ of the optical attenuator is diverged by the directional coupler $13_i$ to reach the directional coupler $16_i$ by way of the optical waveguide $14_i$ and the optical waveguide $15_i$. The light signal is outputted with a predetermined divergence ratio to the output optical waveguide $17_i$ and the monitoring optical waveguide $18_i$ from the directional coupler $16_i$. The divergence ratio is controlled by the temperature of the optical waveguide $14_i$ regulated by the heater $19_i$. By detecting the light power outputted to the monitoring optical waveguide $18_i$ by the light receiving element $20_i$ and by controlling the temperature of the optical waveguide $14_i$ that is, the optical path length, by the heater $19_i$, the ratio (P-out/P-in) of the power P-out of the light signal outputted to the output optical waveguide $17_i$ to the power P-in of the light signal inputted to the input optical waveguide $12_i$, that is, the light attenuation, can be controlled. At this time, the temperature of the optical waveguide $14_i$, that is, the optical path length, is controlled by the heater $19_i$ so that the light signals of the wavelength $\lambda_i$ inputted into each of the output optical waveguides $17_i$ are equal to each other in power to control the light attenuation for the light signal of the wavelength $\lambda_i$.

In a plane waveguide-type optical circuit according to the present embodiment, not only the multi-channel optical attenuator but also the AWG which is a multi-channel output circuit outputting multi-channel light signals are provided on the common substrate 11, therefore this plane waveguide-type optical circuit is easy to manufacture and can be miniaturized.

The present invention is not limited to the above described embodiments but can be modified in a variety of ways. For example the multi-channel output circuit for outputting multi-channel light signals is not limited to the AWG but may be an optical divergence circuit, an optical switching circuit or the like.

As described above in detail, an optical attenuator according to the present invention has a plurality of Mach-Zehnder-type waveguide elements provided on the substrate. The output optical waveguide of each of the plurality of Mach-Zehnder-type waveguide elements is provided in a first region, and the output port of the monitoring optical waveguide of each of the plurality of Mach-Zehnder-type waveguide elements are provided in a second region which is different from the first region on the substrate by crossing the output optical waveguide of one and the monitoring optical waveguide of the other of the Mach-Zehnder-type waveguide elements adjacent to each other. In this way, light receiving elements can be integrally provided for receiving light from the output port of the monitoring optical waveguide of each channel. Optical fibers can also be arranged together on the edge of the substrate for inputting the light signals from the output port of each output optical waveguide corresponding to each channel. Therefore, this optical attenuator is easy to manufacture and can be miniaturized.

In the second region described above, the monitoring optical waveguides of each of the plurality of the Mach-Zehnder-type elements are parallel to each other and spaced next to each other with trenches crossing them formed on the substrate. And, in case light receiving elements are provided in the trenches for receiving light outputted from each of the output ports of each monitoring optical waveguide, this optical attenuator and the optical attenuation system having the same are integrated to include the light receiving elements and can be miniaturized in this aspect.

Further, a plane waveguide-type optical circuit according to the present invention has a multi-channel output circuit for outputting multi-channel light signals and the above-mentioned optical attenuator having the Mach-Zehnder-type waveguide elements according to each of the output channels of the multi-channel output circuit provided on the common substrate. This plane waveguide-type circuit and the optical attenuation system having the same are easy to manufacture and can be miniaturized.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical attenuator with a plurality of Mach-Zehnder-type waveguide elements arranged on a substrate, each of said plurality of Mach-Zehnder-type elements comprising:

an input optical waveguide in which a light signal propagates;

a first dimensional coupler with an incident end connected to said input optical waveguide and two exiting ends;

two optical waveguides respectively connected to said exiting ends of said first directional coupler;

a temperature regulator for regulating the temperature of at least one of said two optical waveguides;

a second directional coupler with two incident ends respectively connected to said two optical waveguides and two exiting ends;

an output optical waveguide connected to one of the exiting ends of said second directional coupler; and an monitoring optical waveguide connected to the other of the exiting ends of said second directional coupler, wherein the monitoring optical waveguide included in one of the Mach-Zehnder-type waveguide elements adjacent to each other within said plurality of Mach-Zehnder-type waveguide elements is arranged to cross with the output optical waveguide included in the other of the Mach-Zehnder-type waveguide element adjacent to each other.

2. An optical attenuator according to claim 1, wherein a crossing angle θ between the monitoring optical waveguide included in one of the Mach-Zehnder-type waveguide elements adjacent to each other within said plurality of Mach-Zehnder-type waveguide elements and the output optical waveguide included in the other of the Mach-Zehnder-type waveguide elements adjacent to each other is 1.1 degrees or more but 2.1 degrees or less.

3. An optical attenuator according to claim 1, wherein each of the monitoring optical waveguides included in one of the Mach-Zehnder-type waveguide elements adjacent to each other within said plurality of Mach-Zehnder-type waveguide elements is arranged in parallel in a state of being spaced adjacent to each other at a predetermined distance and each of the output optical waveguides included in the Mach-Zehnder-type waveguide elements adjacent to each other are arranged in parallel in a state of being spaced next to each other at a predetermined distance.

4. An optical attenuator according to claim 1, wherein the output optical waveguides of said plurality of Mach-Zehnder-type waveguide elements are arranged along a first direction, one group separated from the monitoring optical waveguides of said plurality of Mach-Zehnder-type waveguide elements extend along a second direction crossing said first direction and the other separated group extend along a third direction crossing both said first and second directions.

5. A plane waveguide-type optical circuit comprising:

a substrate;

an optical attenuator according to claim 1 provided on said substrate; and a multi-channel output circuit for outputting light signals which have propagated each of the output optical waveguides of said optical attenuators provided on said substrate.

6. An optical attenuation system comprising:

an optical attenuator according to claim 1; and a control system for monitoring light which has propagated through the monitoring optical waveguide of said optical attenuator and for controlling either temperature regulator in said optical attenuator based on the monitoring result.

* * * * *